United States Patent [19]
del Castillo

[11] 4,070,944
[45] Jan. 31, 1978

[54] OPTICAL METRONOME

[76] Inventor: Juan M. del Castillo, Risco 119, Mexico City 20, D.F., Mexico

[21] Appl. No.: 699,637

[22] Filed: June 24, 1976

Related U.S. Application Data

[63] Continuation-in-part of Ser. No. 594,092, July 8, 1975, Pat. No. 3,996,833.

[51] Int. Cl.² ............................................. G10B 15/00
[52] U.S. Cl. ........................................ 84/484; 84/478; 84/483 R
[58] Field of Search ................. 84/484, 483 R, 483 A, 84/478, 470; 58/130 E

[56] References Cited

U.S. PATENT DOCUMENTS

| | | | |
|---|---|---|---|
| 1,571,110 | 1/1926 | Ebert et al. | 84/484 |
| 1,664,010 | 3/1928 | Welch | 84/484 |
| 1,837,944 | 12/1931 | Blum | 84/484 |
| 2,483,570 | 10/1949 | Bergey | 84/484 |
| 3,744,366 | 7/1973 | del Castillo | 84/478 |
| 3,991,648 | 11/1976 | Karpowicz | 84/484 |

Primary Examiner—Stephen J. Tomsky
Attorney, Agent, or Firm—Karl W. Flocks

[57] ABSTRACT

An optical lighted metronome has a column of light projected onto a sheet of music by means of individual lamps passing light through lenses with the lights connected to illuminate successively by means of motor-driven contact arms or electronic circuitry.

7 Claims, 7 Drawing Figures

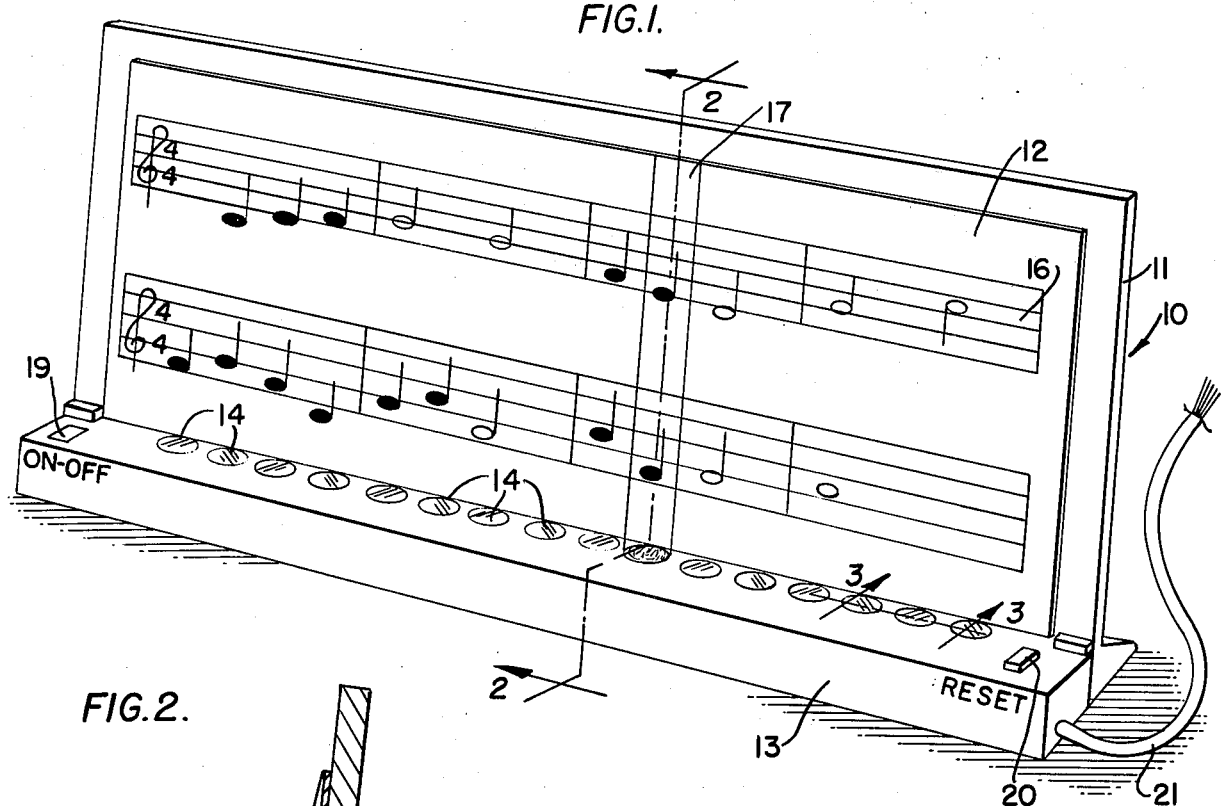
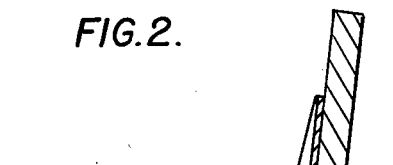
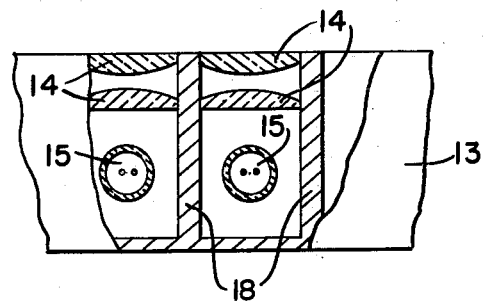
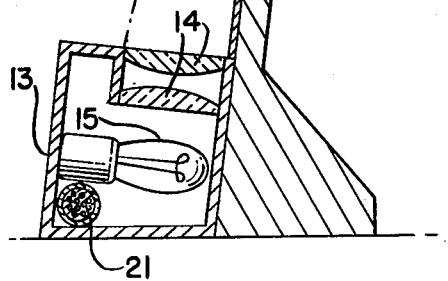

4,070,944

OPTICAL METRONOME

BACKGROUND OF THE INVENTION

The present invention is a continuation-in-part of my application Ser. No. 594,092 filed July 8, 1975, and entitled "Optical Metronome", issued Dec. 14, 1976 as U.S. Pat. No. 3,996,833.

The present invention relates to optical metronomes and more particularly to visual means of helping a person, when playing an instrument, to allow proper timing in accordance with the musical notation.

The devices of the present invention differ from prior art devices by their dynamic system of illumination and by their combination of means to provide visual indication of the note on the musical notation which is to be played and the duration of time that it is to be held.

SUMMARY OF THE INVENTION

The present invention allows the person playing an instrument to observe a sheet of music of similar form to a sheet of music he would later use without aids when he becomes more skilled, and to be shown the note to be played and its duration.

With the present invention lighting means illuminates a sheet of music from a light source in front of the sheet.

An object of the present invention is to utilize a sheet of music having a size and note spacing relative to the spacing between a plurality of lamps.

With the present invention lighting means illuminates a sheet of music which may be opaque with lights placed in front of the sheet and in a form of a column of light. The lighted portion thereby illuminates all staves thus considerably shortening the time of waiting to continue playing if stopped by a mistake or falling behind. With the showing of a lighted portion in all staves the playing can be continued in any staff after the column of light has transversed one staff length.

One embodiment provides lighting to individual lamps connected by a rotating contact mounted for timed rotation.

Still another embodiment provides the timing through use of an oscillator connected through gating means to individual lamps.

BRIEF DESCRIPTION OF THE DRAWINGS

A complete understanding of the invention may be had from the following description of particular embodiments of the invention. In the description, reference is made to the accompanying drawings of which:

FIG. 1 is perspective view of an optical metronome of the present invention;

FIG. 2 is a sectional elevational view along lines 2—2 of FIG. 1;

FIG. 3 is an enlarged partial section along lines 3—3 of FIG. 1;

DESCRIPTION OF THE PREFERRED EMBODIMENTS

Figure 4:
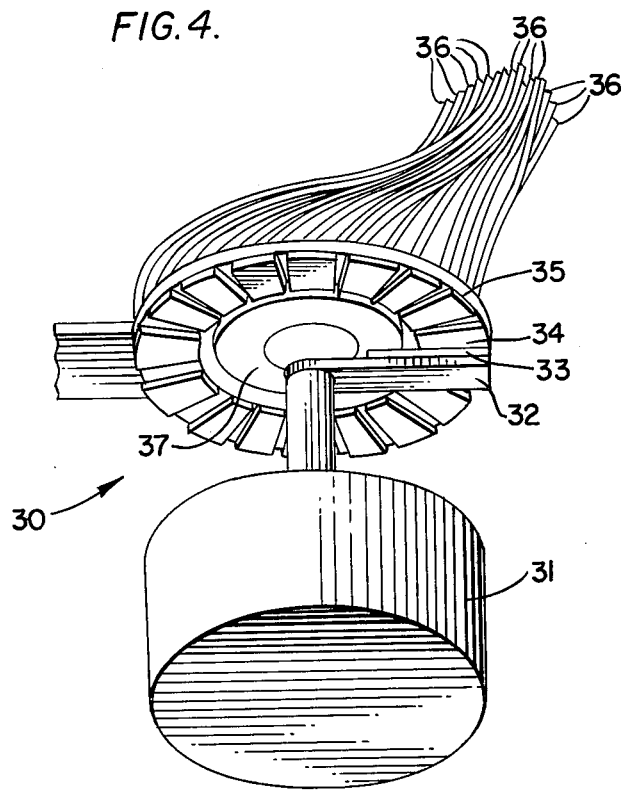
FIG. 4 is an enlarged perspective view of the motor control section of the present invention which is connected to the device of FIG. 1.

Referring first to FIG. 1 there is shown an optical metronome 10 which is placed so as to stand in a convenient position for viewing by the player of a musical instrument. Optical metronome 10 has an upright back portion 11 which may be the conventional music rack found on a piano or organ or may be incorporated as part of the present invention. A sheet of music 12 is held against back 11. Since the sheet 12 may be of heavy opaque material it may need no further clamping or other support to remain flat against the music rack or back of the optical metronome. If the sheet 12 is of thin material requiring support then some means such as clamps may be used to hold the sheet 12 in place.

Situated at the base of back or music rack 11 in front of the rack is elongated housing 13 extending at least the full length of sheet of music 12. Lenses 14 are arranged in a line along the length of housing 13 in the top portion of housing 13. As shown in more detail in FIGS. 2 and 3 a lamp 15 is located beneath each of lenses 14 with the lenses 14 forming a lens system above each lamp 15 so as to project a columnar beam of light up onto sheet 12 as each of lamps 15 is successively lighted. Lenses 14 form a lens system which forms a parallel beam of light which crosses each of staves 16 simultaneously. FIG. 1 shows only two staves but in a similar manner any number of staves may be used. The only limiting factor remains in the size of the sheets of music 12 which may be easily handled and supported on a music rack. In order to allow better definition of the beam of light 17 each lamp and lens system is best placed in a separate compartment having opaque walls 18 to avoid carry-through of the light to the lenses of the adjoining lens system. Also located on housing 13 is on-off switch 19 and reset switch 20. The reset switch 20 may be merely connected in a manner to bring the control device through its cycle back to its start position at an accelerated speed.

Figure 5:
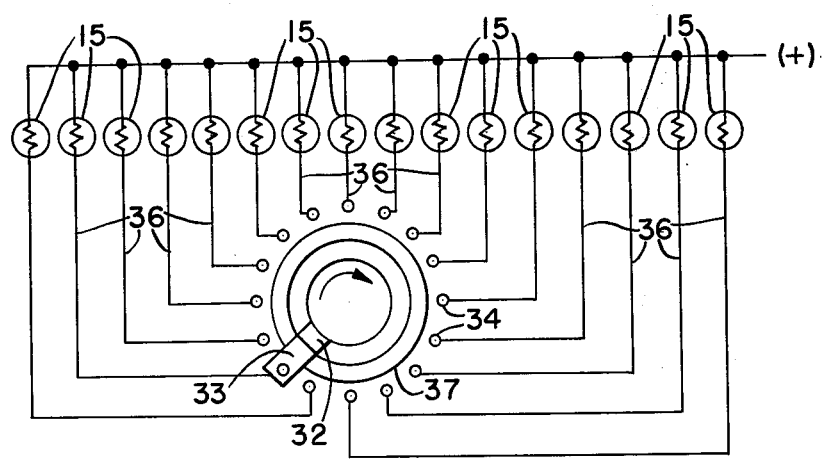
FIG. 5 is an example of a lamp connected circuit used with the control in FIG. 4.

A control device such as the motor-driven control of FIG. 4 connected as shown in FIG. 5 to lamp 15 may be used and connected to housing 13 and the lamps therein through wires 21.

Referring now to FIG. 4 there is shown a motor-driven control 30 wherein controllable speed motor 31 has rotating arms 32 connected to its shaft with electrical contact 33 mounted on its outer end. Electrical contact 33 during its movement contacts in turn each of contact sections 34 which are mounted on isolating plate 35. Wire connectors 36 are connected so as to make electrical contact with sections 34. At the opposite ends of wire connectors 36 are located lamps 15, one for each wire connector 36, with each of these lamps 15 under a lens system 14. Electrically the connection is made from a power source which passes through a lamp 15 to one of the contact sections 34 and then through electrical contact 33 to ring conducting surface 37 which completes the circuit to ground or the power source.

Figure 6:
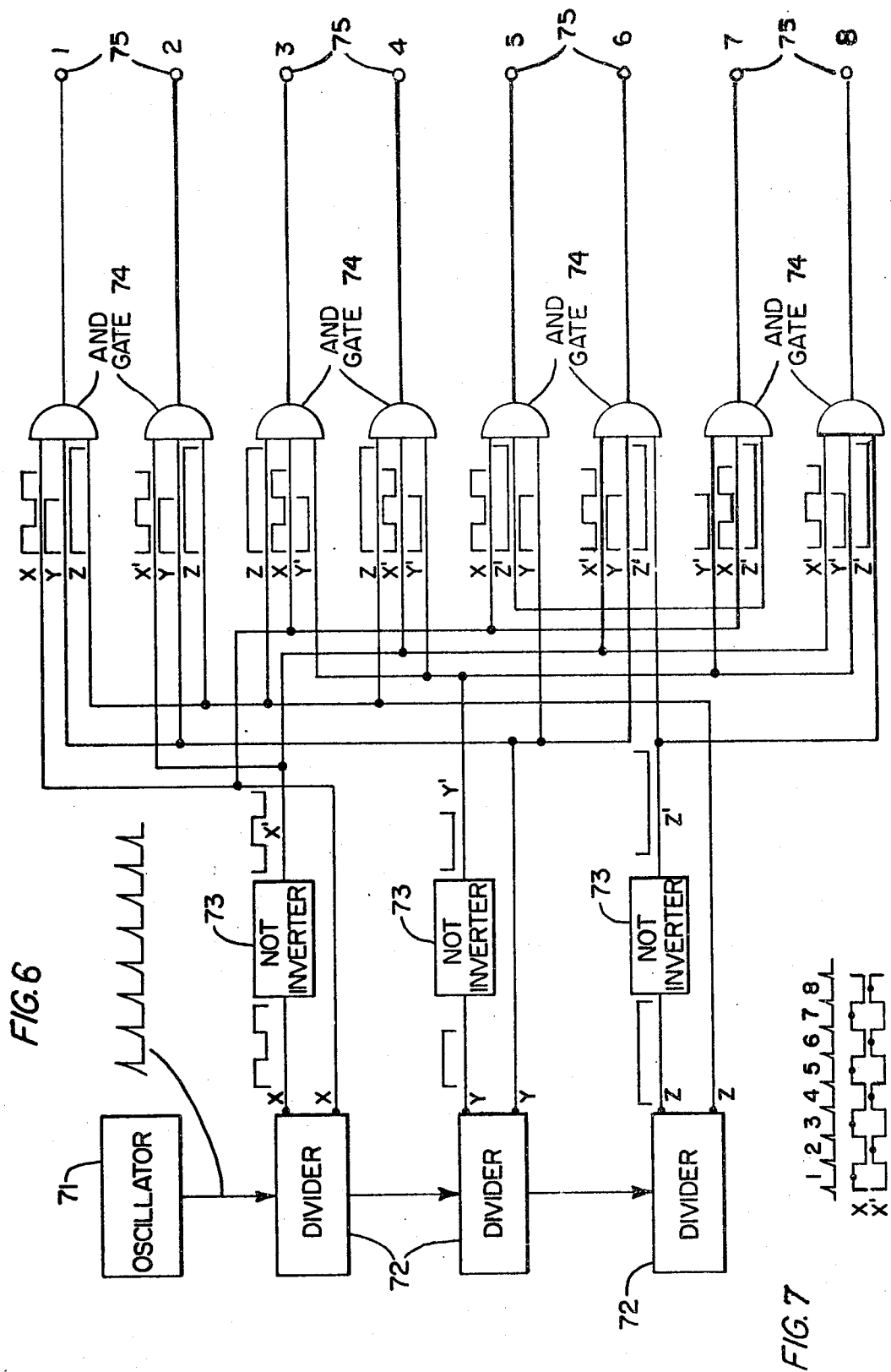
FIG. 6 is a circuit diagram of an alternate means of control of the lighting of the present invention.
Figure 7:
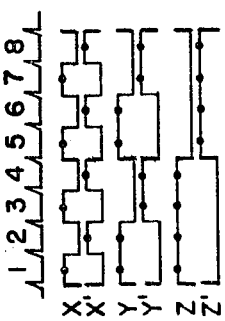
FIG. 7 shows some output wave forms of dividers and inverters of FIG. 6.

Another means of controlling the lighting of the lamps 15 is through electronic circuitry such as, for example, that which is shown in FIG. 6. In this form of control an oscillator 71 feeds a series of pulses to dividers 72, each of which has a pulse form output sent through two outputs, one of each of which is fed through an inverter or NOT circuit 73. Pulses directly from the dividers and from the inverters are selectively fed to each of AND gates 74 and thence through gates 74 in sequence to light sources or lamps 75 or as shown in other figures lamps 15. Outputs of the dividers 72 and inverters 73 are shown diagramatically in FIG. 15 with dots on the pulse forms to designate the gating operation to channel power to each of eight designated lamp positions 75 in sequence and combinations triggering each of the AND gates 74. Thus such electronic circuitry may be used to control the lamps of the present invention or, in fact, any sequence generator may be substituted to perform electronically the control of sequential lighting of the lamps.

Each of the control circuits shown in FIGS. 4 through 6 can be altered to accommodate the number of lamps required and this number will be determined to some extent by the length of the housing 13 which can be comfortably accommodated on the instrument and the length of the music sheet 12 which can be accommodated to the playing of that instrument.

The optical metronome of the present invention flashes a column of light upward from along the base of the sheets of music. At some times the column of light appears over a point on the staff on the music sheet at which there is no musical notation. At such times this is merely an indication to the player of the instrument that the previous note is to be held for a duration of time until the column of light again covers a following musical notation. Thus the device of the present invention is clearly able to define the note to be played and the duration of time for continuing that note.

The sheets of music 12 used with the optical metronome of the present invention differ from the sheets of music ordinarily encountered by the musician although having an appearance quite similar to those sheets. Not only must the size of the sheets be altered to fit the metronome face resulting in staves which may even be double the length of staves in regular sheets of music but the beats per staff during which a light or lighted channel appears must be of a number compatible with the mechanism of the optical metronome. This involves new layout and re-drawing of sheets of music to plan beats per staff for columns of light to appear at each note or at spaces following where there is no note due to music being played or timing variation among types of notes, and comparably the number of measures so as to have the exact number of beats which equals the number of columns of light appearing in a horizontal line. The notes shown on music sheet 12 are merely for illustrative purposes and may not be necessarily drawn in all instances with spacing in conformance with the above explanation because of perspective viewing but an attempt has been made to illustrate the sheet of music of the present invention albeit in very simple form without the music for the bass clef shown thereon. The bass clef notation would of course also be drawn comparable to the measures shown with a single column of light lighting notes for both clefs simultaneously.

It will be obvious to those skilled in the art that various changes may be made without departing from the scope of the invention and the invention is not to be considered to be limited to the preferred embodiment or embodiments as shown in the drawing and described in the Specification.

What is claimed is:

1. An optical metronome for visually indicating the note to be played and the duration of the note on a sheet of music having at least two parallel staves comprising
    means for supporting a sheet of music,
    a housing along an edge of said supporting means in front of a sheet of music and parallel to the staves, and extending at least the length of a staff on the sheet of music,
    and means in said housing to project a series of vertical columns of light successively across the staves on the front of the sheet of music in timed relation to the tempo of the music being played from the sheet of music and spaced at the smallest note time interval with the notes on the sheet of music spaced at intervals related to the duration of each note.

2. The optical metronome of claim 1, further characterized by
    said projecting means including
        a plurality of light sources spaced within said housing,
        means to project each source of light in a vertical column parallel to each of the other of said vertical columns.

3. The optical metronome of claim 2, further characterized by
    each means to project a source of light being a lens system associated with each individual source of light.

4. The optical metronome of claim 3, further characterized by
    each of said sources of light and associated lens system located in a separate compartment in said housing having opaque walls.

5. The optical metronome of claim 2, further characterized by
    said projecting means further including
        a controllable speed motor,
        an isolating plate having electrical contact sections therein equal in number to said light sources,
        a rotating arm and contact thereon mounted for contacting each of said electrical contact sections in turn during a rotation of said arm, and
        said light sources electrically connected to each of said electrical contact sections.

6. The optical metronome of claim 2, further characterized by
    said projecting means further including
        an oscillator means to trigger series of pulses,
        divider means connected to said oscillator means to form different pulse forms,
        inverter means connected to said divider means having outputs with pulse forms inverted from the pulse forms from said divider means,
        a plurality of gating means connected to said divider means and said inverter means to be gated by combinations of pulse forms from said divider means and said inverter means,
        and at least one of said plurality of said light sources connected to each of said gating means.

7. The optical metronome of claim 1, further characterized by
    said housing being located along a bottom edge of said supporting means.

* * * * *